United States Patent
van de Ven

(10) Patent No.: US 7,877,808 B2
(45) Date of Patent: Jan. 25, 2011

(54) USING DIFFERENTIAL INFORMATION ENTROPY TO DETECT BUGS AND SECURITY FLAWS IN COMPUTER PROGRAMS

(75) Inventor: Adriaan van de Ven, Boekel (NL)

(73) Assignee: Red Hat, Inc., Raleigh, NC (US)

( * ) Notice: Subject to any disclaimer, the term of this patent is extended or adjusted under 35 U.S.C. 154(b) by 1115 days.

(21) Appl. No.: 11/171,456

(22) Filed: Jul. 1, 2005

(65) Prior Publication Data

US 2007/0006147 A1   Jan. 4, 2007

(51) Int. Cl.
    *G06F 21/00*   (2006.01)
(52) U.S. Cl. .......................................... 726/24; 713/188
(58) Field of Classification Search ................... 726/22, 726/24
    See application file for complete search history.

(56) References Cited

U.S. PATENT DOCUMENTS

2004/0205717 A1 *  10/2004  Chiang et al. ............... 717/124

* cited by examiner

*Primary Examiner*—Gilberto Barron, Jr.
*Assistant Examiner*—Devin Almeida
(74) *Attorney, Agent, or Firm*—MH2 Technology Law Group LLP

(57) ABSTRACT

Embodiments of the present invention provide program code auditing systems and methods that detect unsafe code and possible errors, such as bugs or security flaws. In some embodiments, the concept of entropy of information is used to estimate when a section of program code may contain a flaw or bug. One or more histories may be used to calculate these entropy values.

18 Claims, 3 Drawing Sheets

USING DIFFERENTIAL INFORMATION ENTROPY TO DETECT BUGS AND SECURITY FLAWS IN COMPUTER PROGRAMS

DESCRIPTION OF THE INVENTION

1. Field of the Invention

The present invention relates generally to the protection of computer systems based on prevention. More particularly, the present invention relates to the protection of computer program code by preventing errors in the code, such as bugs or security flaws.

2. Background of the Invention

Modern computer programs and operating systems can now consist of up to several million lines of code and can be extremely complex. This makes them vulnerable to security exploits that are based on bugs and other errors in the code. Unfortunately, auditing these many million lines of code by hand for such bugs is an enormous task.

Many known tools exist to assist computer programmers in writing program code. However, these tools primarily focus on providing mechanisms, such as inserting break points, trace variables, etc., to control and monitor the execution of the code. The known tools are still unable to easily recognize when a bug or other error exists until after the code has been executed. In addition, the known tools have difficulty in locating a bug or security flaw.

Therefore, it would be desirable to provide methods and systems for auditing and pinpointing sections of program code that contain a bug or are possibly vulnerable to security exploits. In addition, it may be desirable to provide programmers a tool to create program code that is free of bugs and secure.

SUMMARY OF THE INVENTION

In accordance with one feature of the invention, a method of auditing a set of program code is provided. Symbols in the set of program code are parsed. At least one history is determined for the set of program code. A set of values that indicate an extent to which each symbol was expected in the set of program code is determined based on the at least one history. Portions of the set of program code having symbols that were unexpected are then determined based on the set of values.

In accordance with another feature of the present invention, a method of auditing program code is provided. A first version of program code that includes a flaw is retrieved. A second version of program code that is different from the first version is also retrieved. For each line of program code, an entropy value is determined. The entropy value indicates an extent the line of program code contains unexpected symbols based on the first and second versions of the program code. Lines of the program code having entropy values having unexpected symbols are then determined.

In accordance with another feature of the present invention, a method of auditing program code is provided. For each symbol in the program code, a first probability that it was expected is determined based on a version of the program code that is known to operate properly. In addition, a second probability that each symbol was expected is determined based on a version of the program code that includes a flaw. A surprise value is determined for portions of the program code based on the first and second probabilities for each symbol. Portions of the program code that are expected to include a flaw are then identified based on the surprise value.

Additional features of the invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide program code auditing systems and methods that detect bugs and security flaws. The embodiments of the present invention may be flexible and tolerant of differences in program code yet still able to identify any bug, security flaw, and the like. In particular, in some embodiments, program code may be analyzed based on the concept of entropy of information.

In general, entropy refers to a measure of disorder. That is, information that is highly ordered or predictable can be described as having a low entropy. Conversely, information that contains portions, which are disordered or unpredictable, can be described as having a high entropy. Therefore, entropy values can be useful in predicting when information contains portions that fail to follow an order or structure.

When information follows a set context, entropy values for portions of that information can be calculated quite accurately. For example, based on the common spellings used in the English language, the probability the letter "u" will appear in a word when the previous letter was a "q" is relatively high. As a result, the entropy that the letter "u" will follow after "q" will be a fairly low value. Likewise, the entropy that the letter "w" will follow after "q" will be a fairly high value, because such a combination is generally unexpected in the English language. Thus, entropy values can be useful for information that is highly ordered and possesses a known context.

In some embodiments, program code is audited based on entropy, because the symbols used in program code generally follows a well defined set of rules as its context. The term symbols may generally refer to any character or group of characters, such as a letter, one or more words, and the like. For example, it may be assumed that security flaws or bugs will produce a high entropy value because they will deviate from the known rules or context of properly operating program code and, in most cases, program code is expected to operate properly. One skilled in the art will recognize that security flaws and bugs may refer generally to any error or anomaly in program code.

Reference will now be made in detail to exemplary embodiments of the invention, which are illustrated in the accompanying drawings. Wherever possible, the same reference numbers will be used throughout the drawings to refer to the same or like parts.

Figure 1:
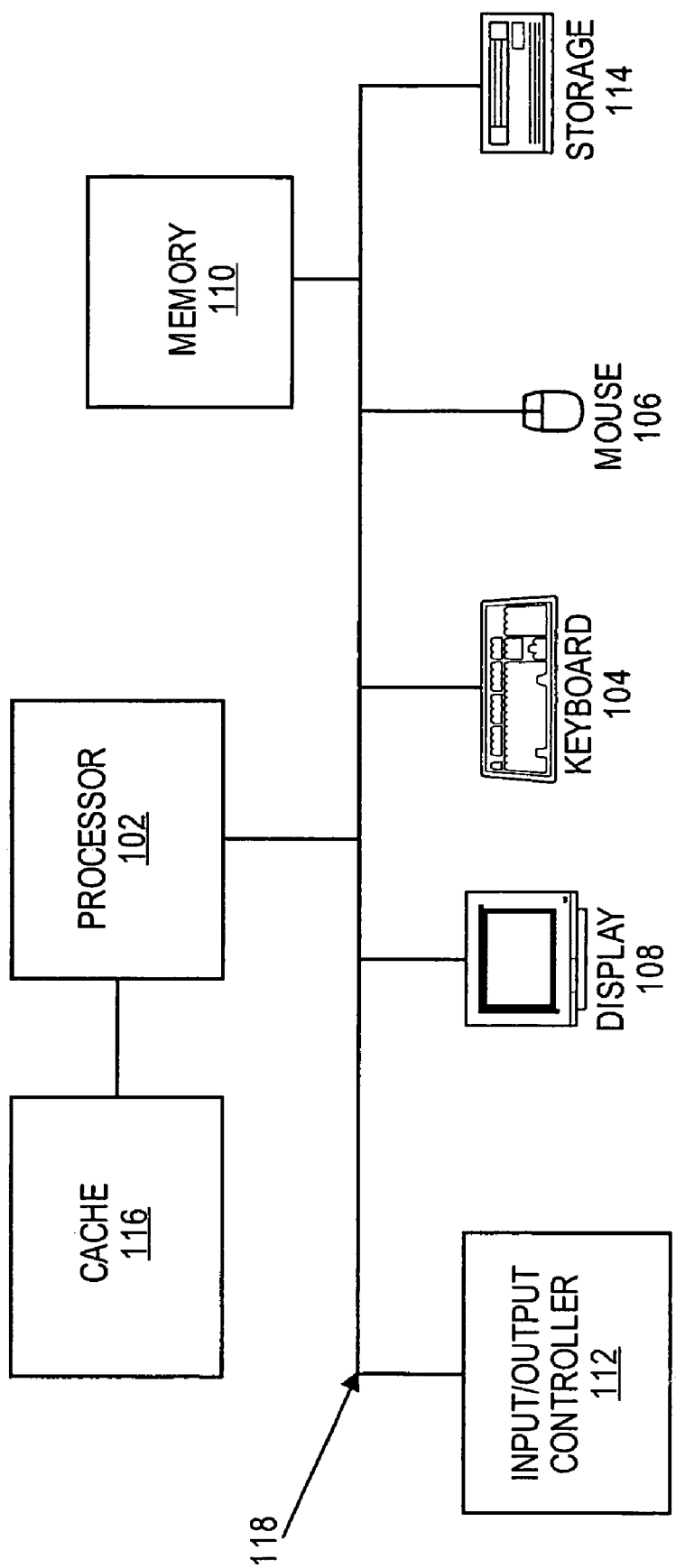
FIG. 1 illustrates a general purpose computer system that is consistent with the principles of the present invention.

FIG. 1 illustrates a general purpose computer system 100 that is consistent with the principles of the present invention. Computer system 100 may be programmed to provide a program code auditing tool that is consistent with the principles of the present invention. Examples of the components that may be included in computer system 100 will now be described.

As shown, a computer system 100 may include a central processor 102, a keyboard 104, a pointing device 106 (e.g., mouse, or the like), a display 108, a main memory 110, an input/output controller 112, and a storage device 114. Processor 102 may further include a cache memory 116 for storing frequently accessed information. Cache 116 may be an "on-chip" cache or external cache. System 100 may also be provided with additional input/output devices, such as a printer (not shown). The various components of the system 100 communicate through a system bus 118 or similar architecture.

Figure 2:
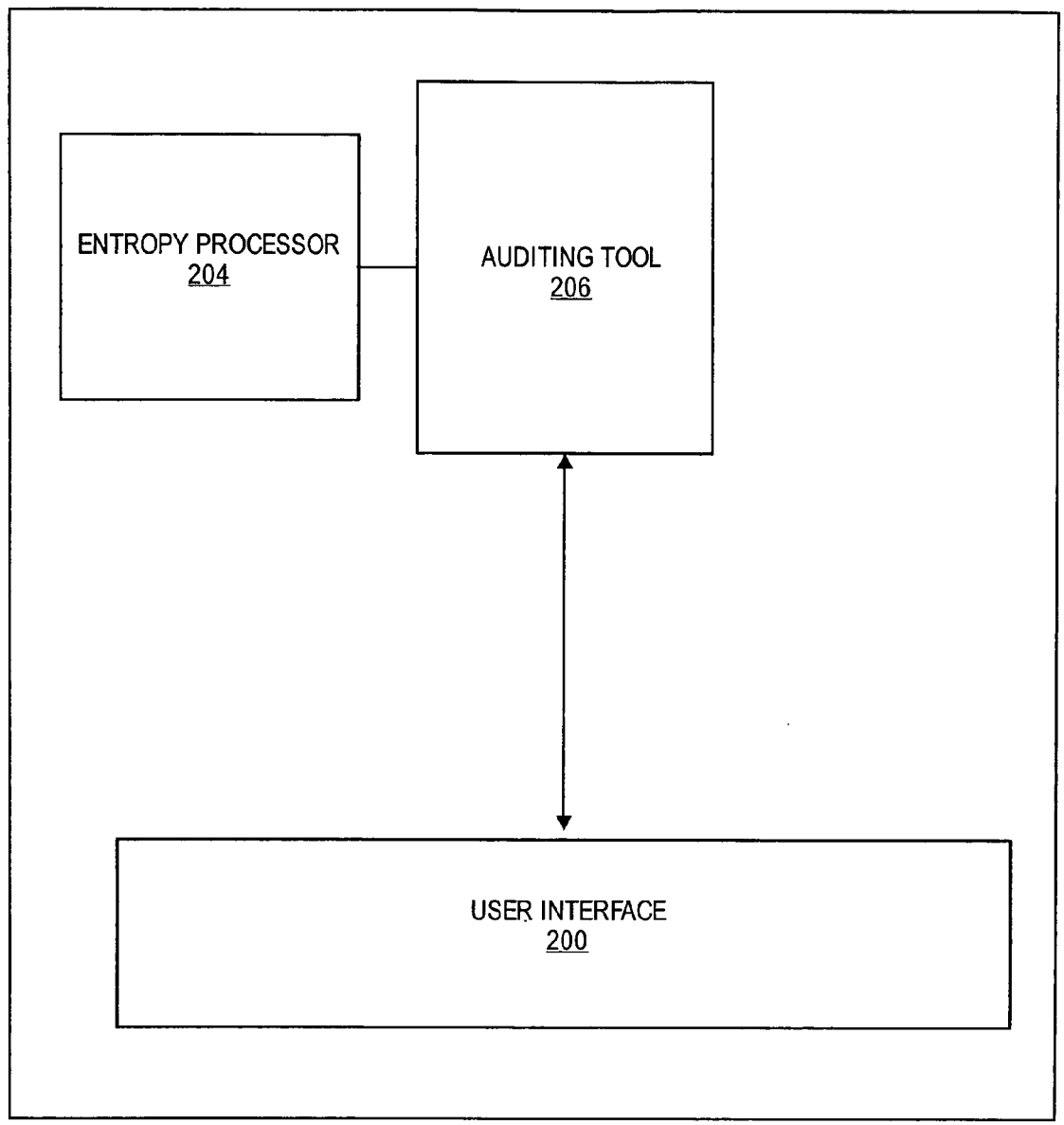
FIG. 2 illustrates a functional block diagram of a system in which one embodiment of the present invention may be implemented.

FIG. 2 illustrates a functional block diagram of system 100 in which one embodiment of the present invention may be implemented. As shown, system 100 comprises a user interface (UI) 200, an entropy processor 202, and an auditing tool 204. Together, components 200, 202, and 204 may enable a user to audit program code and correct flaws, bugs, and security holes, or write new code that is safe. Embodiments of the present invention will be now described for illustrative purposes. One skilled in the art will recognize, however, that the present invention may be applied generally to any context in which it is desirable to audit, debug, or write program code.

UI 200 provides an interface for a user to interact with the other components, such as auditing tool 204 and entropy processor 202. In one embodiment, UI 200 may be implemented as a graphical user interface, which is well known to those skilled in the art. Of course UI 200 may take the form of any type of user interface, such as a text-based interface.

UI 200 may allow the user to perform a number of different functions and operations. For example, UI 200 may view the program code being audited or may provide an editor for writing/modifying program code. UI 200 may use a number of different windows to display the program code. Of course, UI 200 may allow the user click on or select various portions of program code to perform various actions, such as editing statements, specifying breakpoints, etc. Such features are well known to those skilled in the art.

The user may further use UI 200 to initiate processing by auditing tool 204 and entropy processor 202. For example, the user may specify a file or location for the program code to be processed by auditing tool 204 and initiate the calculations by entropy processor 202. The user may also use UI 200 to specify various options offered by auditing tool 204 and entropy processor 202.

UI 200 may show the results of an audit by visually using color or typographic symbols to mark the relevant portions of the code. UI 200 may also allow the user to mark some piece of code as "OK." This indication may also be used to adjust the history of the code so that system 100 can learn from its own operations and from the user. Alternatively, UI 200 may allow a user to mark a piece of code as having a known flaw or bug, or a known fix. For example, the user may use a special marker to indicate that a piece of program code contains "a security fix of type FOO."

Entropy processor 202 can be responsible for calculating various entropy values of the program code. In some embodiments, entropy processor 202 may calculate entropy values for symbols in program code of a wide variety of programming languages, such as C, C++, and the like. In general, entropy processor 202 may calculate entropy values based on one or more calculations that a symbol "X" within a context "Y" (such as the programming language of the program code) was expected based on a history "Z." Entropy processor 202 may determine the context, for example, based on the specific language used in the program code and the various statements in which a symbol appears. In addition, entropy processor 202 may use a number of different histories. The histories used by entropy processor 202 may be predetermined or specified by the user, for example, via UI 200. The histories may be versions of the program code or may be files that include representative information and meta-data about the program code. Entropy processor 202 may retrieve histories locally from storage 114 or remotely from another device (not shown). For example, system 100 may be coupled to a library or database that contains a large number of histories for program code. This library may be organized in various ways, such as by programming language, by type of flaw, by date, by application, by operating system, etc. Each flaw or bug may have its own history and may have multiple types of histories. Alternatively, each flaw or bug may be grouped into one or more classes and each class may have its own set of histories.

In some embodiments, entropy processor 202 may calculate entropy values for a set of program code by using a single history, such as a history for a set of program code with a known flaw or a history for a set of program code that is known to operate properly. In other embodiments, entropy processor 202 may use multiple histories for its entropy calculations. For example, a first (or insecure) history may be a set of collected code that is known to have security hole or bug from past experience. Entropy processor 202 may use symbols from a few lines of code surrounding the security hole to calculate the entropy. A second (or secure) history may be for the same set of code, but with the security holes or bugs fixed. Entropy processor 202 may then use the two histories to calculate respective entropies and calculate what is referred to as a differential entropy value or "surprise" value. This surprise value may thus indicate the extent a symbol was expected relative to multiple histories. For example, in some embodiments, entropy processor 202 may calculate a surprise value "I" according to the equation:

$$I = (-2 \log(\text{probability of the symbol in context based on the secure history}) - (-2 \log(\text{probability of the symbol in context based on the insecure history})$$

The equation noted above is merely an example of the calculations that may be implemented in embodiments of the present invention. Other calculations and formulas, such as formulas that use other logarithmic bases, may be used in the calculations by entropy processor 202. In some embodiments, entropy processor 202 may calculate its entropy values based on one or more other known algorithms to determine the probabilities that a symbol was expected. For example, entropy processor 202 may use Context Tree Weighting, LZW, or the LZ77 algorithms to calculate these probabilities for its entropy values. Entropy processor 202 may also combine or average the results of these methods, or take the maximum or median values found to use as probabilities for calculating its entropy values.

When calculating entropy values, entropy processor 202 may parse the program code one symbol at a time, or may parse the program code into words or groups of symbols based on the rules of the programming language. Entropy processor 202 may further calculate a surprise value for each line of code, for example, by summing the I values of the symbols that build or comprise that line. Of course, entropy processor 202 may calculate a surprise value for each line of code based on other techniques, such as averaging or selecting a minimum or maximum value. Entropy processor 202 may then output its results to auditing tool 204.

Auditing tool 204 is responsible for identifying flaws or bugs in the program code based on the data provided from entropy processor 202. For example, auditing tool 204 may analyze the entropy or surprise values calculated for each line of program code and mark those lines of code that have an unusual value (e.g., unusually low or high). Auditing tool 204 may mark or flag lines of code in a program that have values that are above a threshold value, and thus, may have high probability of having a flaw or security hole. Of course, one skilled in the art will recognize that embodiments of the invention may consider either positive or negative values as unusual and may set its thresholds accordingly.

Auditing tool 204 may also assist the user when writing new code while the user is typing in the program code or based on a batch processing. For example, the user may submit a section of new code to auditing tool 204 via UI 202, which then invokes entropy processor 202 to calculate entropy or surprise values for the new code. Auditing tool 204 may then analyze these surprise values of the new code and identify or highlight those lines which have a high probability of containing a security flaw or bug based on the surprise values. Auditing tool 204 may also determine whether a known fix exists, based on the histories for the security flaw or bug. This information may then be presented via UI 202 in various forms, such as one or more pop-up windows or by highlighting or marking the relevant sections of the program code.

Figure 3:
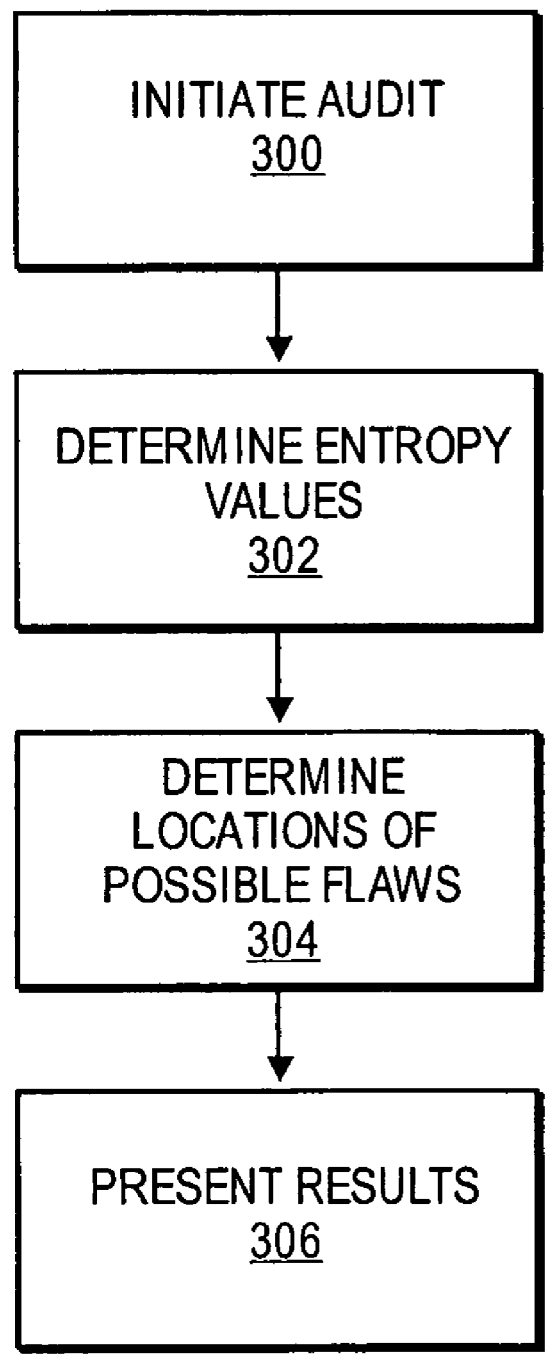
FIG. 3 illustrates a process flow for auditing program code that is consistent with the principles of the present invention.

FIG. 3 illustrates a process flow for auditing program code that is consistent with the principles of the present invention. In order to aid in the description of the process, the stages may be described with reference to the following exemplary sections of program code. For example, a "safe" section of reference program code may contain the symbols "ABC," and may have a known history of operating properly. An "insecure" section of reference program code may contain the symbols "ABD," and may have a known history of containing a bug or security flaw. For example, the symbol "D" may cause the bug or security flaw when following symbol "B." The process flow shown in FIG. 3 will now be described.

In stage 300, a user initiates the audit by selecting the program code and submitting it to the auditing tool 204. For example, the user may use UI 202 to locate or browse for a file that contains the program code. The user may then use UI 202 to select all or some of the program code for analysis. As noted, the user may at this time use UI 202 to mark certain sections of the program code that have known characteristics, such as a known flaw, or a known security fix. As noted, auditing tool 204 may also be configured to audit program code continuously while the user is typing in the program code. For purposes of illustration, it may be assumed that the following sections of program code are being audited. A "safe" audited program code may include the symbols "ABC." An "insecure" audited program code may include the symbols "ABD." And, a "third" audited program code may include the symbols "ABE." The processing associated with these sets of program will now be described and illustrated.

In stage 302, the various entropy values for the program code are determined. For example, UI 202 may pass the program code to auditing tool 204. Auditing tool 204 may then invoke entropy processor 202. Entropy processor 202 may parse the program code one symbol at a time or by groups of symbols. Entropy processor 202 may also retrieve the relevant histories needed for calculating the entropy values. Entropy processor 202 may retrieve these histories locally or remotely from another system.

Entropy processor 202 may then calculate the entropy values for the program code. As noted, entropy processor 202 may use one or more histories in calculating these values. For example, entropy processor 202 may calculate the entropy values based on the safe reference program code as a history or the insecure reference program code as a history. For example, for the safe audited program code, the symbol "C" was expected with a high probability based on the history provided by the safe reference program code, and thus, has a low entropy value. Conversely, for the safe audited program code, the symbol "C" was not expected based on the history provided by the insecure reference program code. For the insecure audited program code, one skilled in the art will recognize that the symbol "D" will have a high entropy value based on the safe reference program code as a history and will have a low entropy value based on the insecure reference program code as a history. As another example, for the third audited program code, one skilled in the art will recognize that the symbol "E" will have a high entropy value based on both the safe and insecure reference program codes as a history.

In other embodiments, entropy processor 202 may use multiple histories and calculate a differential entropy value, such as the I values noted above. For example, the safe audited program code will have a low (or negative) I value based on the safe and insecure reference sections of program noted above. As another example, the insecure audited program code will have a high (or positive) I valued based on the same reference sections of program code. Furthermore, the third audited program code will have a zero or low I value because its entropy in relation to both the safe and insecure sections of reference program code will be similar. In some embodiments, this use of multiple histories to calculate a differential entropy or I value may be considered useful in order to minimize false positives due to minor differences between the audited program code and the reference program code. Hence, with multiple histories, entropy processor 202 may be flexible to variations in the program code. Of course, one skilled in the art will recognize that entropy processor 202 may use a combination of calculations based on one or more histories.

In addition, in some embodiments, entropy processor 202 may calculate entropy values for each line of program code based on known techniques. These techniques may include summing the values of the symbols comprising a line of code or some other calculation, such as a mean value or median value. Processing may then flow to stage 304.

In stage 304, auditing tool 204 analyzes the entropy values and determines which portions of the program code are likely to contain a security flaw, bug, or other type of flaw. For example, auditing tool 204 may select those lines of code having an entropy value or differential entropy value, such as the I values noted above, that is greater than a threshold number. Of course, other algorithms may be used. For example, auditing tool 204 may calculate a mean and median of the surprise values found. Auditing tool 204 may then mark those lines having surprise values which are significantly deviant from the mean or median. Processing may then flow to stage 306.

In stage 306, the results may be presented to the user. For example, auditing tool 204 may work in conjunction with UI 202 to provide one or more windows that display the program code. Various portions of the program code may be highlighted or marked to indicate whether a security flaw or bug is suspected. UI 202 may also provide one or more informational windows. For example, UI 202 may be configured to provide information about a security hole or bug, such as the nature of its problem and when it was discovered. UI 202 may also provide information regarding how to repair a particular security hole or bug. For example, UI 202 may suggest one or more changes to the program code or may indicate a known fix that has already proved successful.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of auditing a set of program code using a computer, said method comprising:
 parsing symbols in the audited set of program code;
 retrieving a flawed set of program code with a known error and a good set of program code that is known to operate properly;
 calculating, for each of the symbols, a first probability that the symbol was expected based on the flawed set of program code and a second probability that the symbol was expected based on the good set of program code;
 determining and storing in a memory of the computer, for each of the symbols, an entropy value indicating a likelihood that the symbol was expected based on the first and second probabilities associated with the symbol; and
 determining whether the audited set of program code has one or more of the symbols that are unexpected based on the entropy values.

2. The method of claim 1, wherein parsing symbols in the set of program code comprises:
 identifying a programming language of the audited set of program code; and
 grouping the symbols in the audited set of program code based on the programming language.

3. The method of claim 1, wherein determining portions of the audited set of program code comprises determining the one or more unexpected symbols having the entropy values that are greater than a threshold.

4. An apparatus comprising a computer memory containing instructions and a processor coupled to the computer memory and configured to execute the instructions
 parsing symbols in the audited set of program code;
 retrieving a flawed set of program code with a known error and a good set of program code that is known to operate properly;
 calculating, for each of the symbols, a first probability that the symbol was expected based on the flawed set of program code and a second probability that the symbol was expected based on the good set of program code;
 determining and storing in a memory of the computer, for each of the symbols, an entropy value indicating a likelihood that the symbol was expected based on the first and second probabilities associated with the symbol; and
 determining whether the audited set of program code has one or more of the symbols that are unexpected based on the entropy values.

5. A non-transitory computer readable medium comprising computer program code that causes a processor to
 parse symbols in the audited set of program code;
 retrieve a flawed set of program code with a known error and a good set of program code that is known to operate properly;
 calculate, for each of the symbols, a first probability that the symbol was expected based on the flawed set of program code and a second probability that the symbol was expected based on the good set of program code;
 determine and store in a memory of the computer, for each of the symbols, an entropy value indicating a likelihood that the symbol was expected based on the first and second probabilities associated with the symbol; and
 determine whether the audited set of program code has one or more of the symbols that are unexpected based on the entropy values.

6. A method of auditing program code using a computer, said method comprising:
 retrieving a flawed version of the program code that includes an error;
 retrieving a second version of the program code that is different from the flawed version;
 determining and storing in a memory of the computer, for each line of the audited program code, an entropy value that indicates a likelihood that the line of the audited program code contains one or more unexpected symbols based on the flawed and second versions of the program code; and
 determining whether lines of the audited program code have entropy values that indicate that the lines of the audited program code have the one or more unexpected symbols.

7. The method of claim 6, wherein retrieving the second version of the program code comprises retrieving a version of the program code that is known to operate properly.

8. The method of claim 6, wherein retrieving the second version of the program code comprises retrieving a version of the program code that is known to operate securely.

9. The method of claim 6, wherein determining and storing the entropy values for each line of the program code comprises determining, for each symbol in the audited program code, a difference in probability that the symbol was expected based on the flawed and second versions of the program code.

10. The method of claim 6, wherein determining the entropy value for each line of the audited program code comprises:
 determining an entropy value for each symbol in each line of the audited program code; and
 summing the entropy values for the symbols in each line of the audited program code to determine the entropy value for each line of the audited program code.

11. The method of claim 6, wherein determining whether lines of the audited program code have entropy values that indicate a likelihood that the lines contain one or more unexpected symbols comprises determining whether lines of the audited program code have entropy values that are greater than a threshold.

12. An apparatus comprising a computer memory containing instructions and a processor coupled to the computer memory and configured to execute the instructions
 retrieving a flawed version of the program code that includes an error;
 retrieving a second version of the program code that is different from the flawed version;
 determining and storing in a memory of the computer, for each line of the audited program code, an entropy value that indicates a likelihood that the line of the audited program code contains one or more unexpected symbols based on the flawed and second versions of the program code; and
 determining whether lines of the audited program code have entropy values that indicate that the lines of the audited program code have the one or more unexpected symbols.

13. A non-transitory computer readable medium comprising computer program code that causes a processor to
- retrieve a flawed version of the program code that includes an error;
- retrieve a second version of the program code that is different from the flawed version;
- determine and store in a memory of the computer, for each line of the audited program code, an entropy value that indicates a likelihood that the line of the audited program code contains one or more unexpected symbols based on the flawed and second versions of the program code; and
- determine whether lines of the audited program code have entropy values that indicate that the lines of the audited program code have the one or more unexpected symbols.

14. A method of auditing program code having one or more symbols using a computer, said method comprising:
- determining, for each of the one or more symbols, a first probability that the symbol was expected based on a version of the program code that is known to operate properly;
- determining, for each of the one or more symbols, a second probability that the symbol was expected based on a version of the program code that includes an error;
- determining and storing in a memory of the computer a surprise value for portions of the audited program code based on the first and second probabilities for the one or more symbols in the portions of the audited program code; and
- identifying portions of the audited program code that are expected to include an error based on the surprise value.

15. The method of claim 14, wherein determining and storing the surprise value for portions of the audited program code comprises:
- calculating, for each of the one or more symbols, a difference between the first and second probabilities; and
- determining the surprise value by summing the differences for each of the one or more symbols contained in the portions of the audited program code.

16. The method of claim 14, wherein determining the surprise value for portions of the program code comprises determining surprise values for each line of audited program code.

17. An apparatus comprising a computer memory containing instructions and a processor coupled to the computer memory and configured to execute the instructions
- determining, for each of the one or more symbols, a first probability that the symbol was expected based on a version of the program code that is known to operate properly;
- determining, for each of the one or more symbols, a second probability that the symbol was expected based on a version of the program code that includes an error;
- determining and storing in a memory of the computer a surprise value for portions of the audited program code based on the first and second probabilities for the one or more symbols in the portions of the audited program code; and
- identifying portions of the audited program code that are expected to include an error based on the surprise value.

18. A non-transitory computer readable medium comprising computer program code that causes a processor to
- determine, for each of the one or more symbols, a first probability that the symbol was expected based on a version of the program code that is known to operate properly;
- determine, for each of the one or more symbols, a second probability that the symbol was expected based on a version of the program code that includes an error;
- determine and store in a memory of the computer a surprise value for portions of the audited program code based on the first and second probabilities for the one or more symbols in the portions of the audited program code; and
- identify portions of the audited program code that are expected to include an error based on the surprise value.

* * * * *